United States Patent
Ko et al.

(10) Patent No.: US 9,462,057 B2
(45) Date of Patent: Oct. 4, 2016

(54) LOCATION-BASED CONTENT-CENTRIC NETWORKING METHOD

(71) Applicant: AJOU UNIVERSITY INDUSTRY COOPERATION FOUNDATION, Gyeonggi-do (KR)

(72) Inventors: Young Bae Ko, Gyeonggi-do (KR); Sung Won Lee, Gyeonggi-do (KR)

(73) Assignee: AJOU UNIVERSITY INDUSTRY COOPERATION FOUNDATION, Gyeonggi-Do (KR)

( * ) Notice: Subject to any disclaimer, the term of this patent is extended or adjusted under 35 U.S.C. 154(b) by 326 days.

(21) Appl. No.: 13/929,510

(22) Filed: Jun. 27, 2013

(65) Prior Publication Data
US 2014/0222891 A1  Aug. 7, 2014

(30) Foreign Application Priority Data
Feb. 4, 2013  (KR) ......................... 10-2013-0012476

(51) Int. Cl.
H04W 4/02 (2009.01)
H04L 29/08 (2006.01)

(52) U.S. Cl.
CPC ............ H04L 67/1097 (2013.01); H04W 4/02 (2013.01)

(58) Field of Classification Search
CPC .. H04L 67/1097; H04L 45/54; G06F 15/173
USPC ........................................................ 709/203
See application file for complete search history.

(56) References Cited

U.S. PATENT DOCUMENTS

| | | | |
|---|---|---|---|
| 8,638,271 B2* | 1/2014 | Wang | H01Q 21/30 343/700 MS |
| 2001/0056416 A1* | 12/2001 | Garcia-Luna-Aceves | G06F 12/1483 |
| 2002/0143984 A1* | 10/2002 | Hudson Michel | G06F 17/30902 709/238 |
| 2007/0156842 A1* | 7/2007 | Vermeulen | G06F 17/30212 709/217 |
| 2009/0285209 A1* | 11/2009 | Stewart | H04L 65/1006 370/389 |

(Continued)

FOREIGN PATENT DOCUMENTS

| | | | | |
|---|---|---|---|---|
| KR | 10-2012-0014104 | 2/2012 | | |
| KR | 1020120058782 | 6/2012 | ............. | H04L 12/28 |

(Continued)

OTHER PUBLICATIONS

Korean Office Action dated Feb. 24, 2014 for KR 10-2013-0012476; no English Translation available at this time.

(Continued)

Primary Examiner — Kevin Bates
Assistant Examiner — Mark A Scott
(74) Attorney, Agent, or Firm — Harness, Dickey & Pierce, P.L.C.

(57) ABSTRACT

A location-based content-centric networking method for location-based content is provided. The location-based content-centric networking method may include: naming location-based content in such a manner that the name given to the location-based content includes a hierarchical prefix corresponding to information contained in the location-based content; and forwarding the location-based content based on prefix information of the location-based content.

17 Claims, 4 Drawing Sheets

(56) References Cited

U.S. PATENT DOCUMENTS

| | | | |
|---|---|---|---|
| 2010/0195654 A1* | 8/2010 | Jacobson | H04L 45/7457 370/392 |
| 2010/0195655 A1* | 8/2010 | Jacobson | H04L 45/748 370/392 |
| 2010/0229205 A1* | 9/2010 | Hakusui | H04H 20/72 725/62 |
| 2010/0265951 A1* | 10/2010 | Fujita | H04L 45/12 370/392 |
| 2010/0299702 A1* | 11/2010 | Lo | G06Q 20/123 725/39 |
| 2011/0082982 A1* | 4/2011 | Harvell | G06F 17/30902 711/122 |
| 2011/0107379 A1* | 5/2011 | Lajoie | H04L 65/1016 725/87 |
| 2011/0161355 A1* | 6/2011 | Lee | H04L 45/00 707/769 |
| 2011/0265174 A1* | 10/2011 | Thornton | H04L 67/327 726/15 |
| 2012/0155348 A1 | 6/2012 | Jacobson | 370/311 |
| 2012/0159176 A1* | 6/2012 | Ravindran et al. | 713/176 |
| 2012/0166806 A1* | 6/2012 | Zhang | H04L 9/3247 713/176 |
| 2012/0204224 A1* | 8/2012 | Wang | H04L 67/2819 726/3 |
| 2012/0230199 A1* | 9/2012 | Chiabaut | 370/238 |
| 2012/0290696 A1* | 11/2012 | Wu | G06F 17/30091 709/223 |
| 2012/0297088 A1* | 11/2012 | Wang | H04L 63/0272 709/238 |
| 2012/0317307 A1* | 12/2012 | Ravindran | H04L 12/6418 709/238 |
| 2013/0007186 A1* | 1/2013 | Liu | H04L 67/1008 709/213 |
| 2013/0060962 A1* | 3/2013 | Wang et al. | 709/238 |
| 2013/0188513 A1* | 7/2013 | Vasseur et al. | 370/254 |
| 2013/0219081 A1* | 8/2013 | Qian | H04L 67/327 709/241 |
| 2013/0227048 A1* | 8/2013 | Xie et al. | 709/213 |
| 2013/0242996 A1* | 9/2013 | Varvello | H04L 67/327 370/392 |
| 2013/0258878 A1* | 10/2013 | Wakikawa | G08G 1/0112 370/252 |
| 2013/0282860 A1* | 10/2013 | Zhang | H04L 45/306 709/217 |
| 2013/0282920 A1* | 10/2013 | Zhang | H04L 45/74 709/238 |
| 2013/0290697 A1* | 10/2013 | Wang | H04L 63/0428 713/150 |
| 2013/0332955 A1* | 12/2013 | Hong | H04N 21/64784 725/34 |
| 2014/0032714 A1* | 1/2014 | Liu | H04L 67/18 709/217 |
| 2014/0122737 A1* | 5/2014 | Silberstein | G06F 17/30041 709/231 |
| 2014/0143446 A1* | 5/2014 | Jacobson et al. | 709/248 |
| 2014/0146819 A1* | 5/2014 | Bae et al. | 370/392 |
| 2014/0173034 A1* | 6/2014 | Liu | H04L 67/1063 709/217 |
| 2014/0189060 A1* | 7/2014 | Westphal | H04W 36/0016 709/217 |

FOREIGN PATENT DOCUMENTS

| | | | |
|---|---|---|---|
| KR | 10-2012-0128042 | 11/2012 | |
| KR | 1020120136544 | 12/2012 | G06F 21/24 |

OTHER PUBLICATIONS

Korean Notice of Allowance issued on Nov. 25, 2014; no English Translation available at this time.

\* cited by examiner

LOCATION-BASED CONTENT-CENTRIC NETWORKING METHOD

CROSS-REFERENCE TO RELATED APPLICATION

This application claims the benefit under 35 U.S.C. §119 (a) of Korean Patent Application No. 10-2013-0012476, filed on Feb. 4, 2013, the entire disclosure of which is incorporated herein by reference.

FIELD

The following description relates to a content-centric networking method, and more particularly, to a location-based content-centric networking method.

BACKGROUND

Communication characteristics of the Internet users are content-centric rather than location-centric, focusing more on what content is to obtain than on where to obtain. To share content with another user in typical Internet protocol (IP)-based communication systems, a user needs to know an IP address (where) of another user to share content with. Also, it is required to build a connection link (or a path) between the IP of the user's device and the IP of the peer device. In an environment where such requirements are satisfied, the user further needs to use a third server for sharing content. Hence, the IP-based connection which is based on end-to-end communications may have difficulties in supporting content-centric data sharing services.

In contrast, content-centric networking is a new paradigm for the future Internet to overcome the limitations of current IP-based networking. The content-centric networking allows intermediate nodes on the Internet to store in a cache area the content that they transmit to another node and to thereby perform a role of a content server by transmitting the stored content to an Internet user on request. The content-centric networking is capable of providing a user with desired content from a closer location to the user, and thus can reduce the overall network communication load and a delay time in acquiring the content requested by the user.

In implementing the content-centric network, there is a need to develop data transmission algorithms which are suitable for Internet content characteristics. Currently, there is no clear distinction between the content creators and the content consumers, such that users can be both content creators and consumers at the same time, and content created by such users have local dependence. The users tend to acquire content located close to them among the location-based content, and are more likely to search for content based on landmarks.

Therefore, there is a need for an effective data transmission technology for location-based content in a content-centric network.

Related Patent Document: KR 10-2012-0058782 A

SUMMARY

The following description relates to a method for effectively providing location-based content services in the field of content-centric networking-based communications.

In one general aspect, there is provided a location-based content-centric networking method for location-based content, including: naming location-based content in such a manner that the name given to the location-based content includes a hierarchical prefix corresponding to information contained in the location-based content; and forwarding the location-based content based on prefix information of the location-based content.

The naming of the location-based content may include defining a first prefix at a very beginning of the given name in order to distinguish the location-based content from other content by means of a longest prefix matching (LPM) scheme.

The naming of the collected location-based content may include defining a second prefix to clarify a user's intention. The user's intention may be to search or to advertise content.

The naming of the collected location-based content may include defining a third prefix to classify a type of the location-based content. The naming of the collected location-based content may include defining a fourth prefix including location information of the location-based content.

The naming of the collected location-based content may include defining a fifth prefix including a context name as a target of the location-based content. The location-based content-centric networking method may further include receiving a user's interest for requesting the location-based content. The user's interest may include an identifier of the location-based content requested by a user.

The forwarding of the location-based content may include transmitting the location-based content to neighboring nodes so as to advertise the content, or transmitting the user's interest to the neighboring nodes so as to acquire the location-based content requested by the user.

The forwarding of the location-based content may utilize location information about where the location-based content is created and location information of a node that receives the user's interest or the location-based content. The forwarding of the location-based content to the neighboring nodes comprises advertising created or updated location-based content to nodes within a predetermined range of area according to predefined rules.

A prefix which indicates advertisement of the location-based content may be previously registered in a pending interest table (PIT). A geographical range within which the location-based content is advertised may be determined by utilizing information about a distance between the location at which the location-based content is created and the location of the node.

The forwarding of the location-based content may include forwarding the user's interest for the location-based content using location information contained in the location-based content. The location-based content-centric networking method may further include registering in forwarding information base (FIB) prefix information which confirms that the location-based content is location-based content, so as to invoke a function to perform location-based forwarding with respect to the prefix information.

The location-based content-centric networking method may further include caching the location-based content. The caching of the location-based content may include determining, at a node that receives the location-based content, whether to cache the advertised location-based content, based on a distance between the node and the location at which the location-based content is created.

Also, the caching of the location-based content may include caching data in response to the user's interest, wherein a probability of cache replication being executed is set to be reduced with an increase in a distance between a node that receives the data and a target location of location-based content included in the data. In addition, the caching of the location-based content may include caching data in response to the user's interest, wherein a probability of cache replacement being executed is set to be increased with an increase in a distance between a node that receives the data and a location of the location-based content stored in the cache.

Other features and aspects will be apparent from the following detailed description, the drawings, and the claims.

Figure 1:
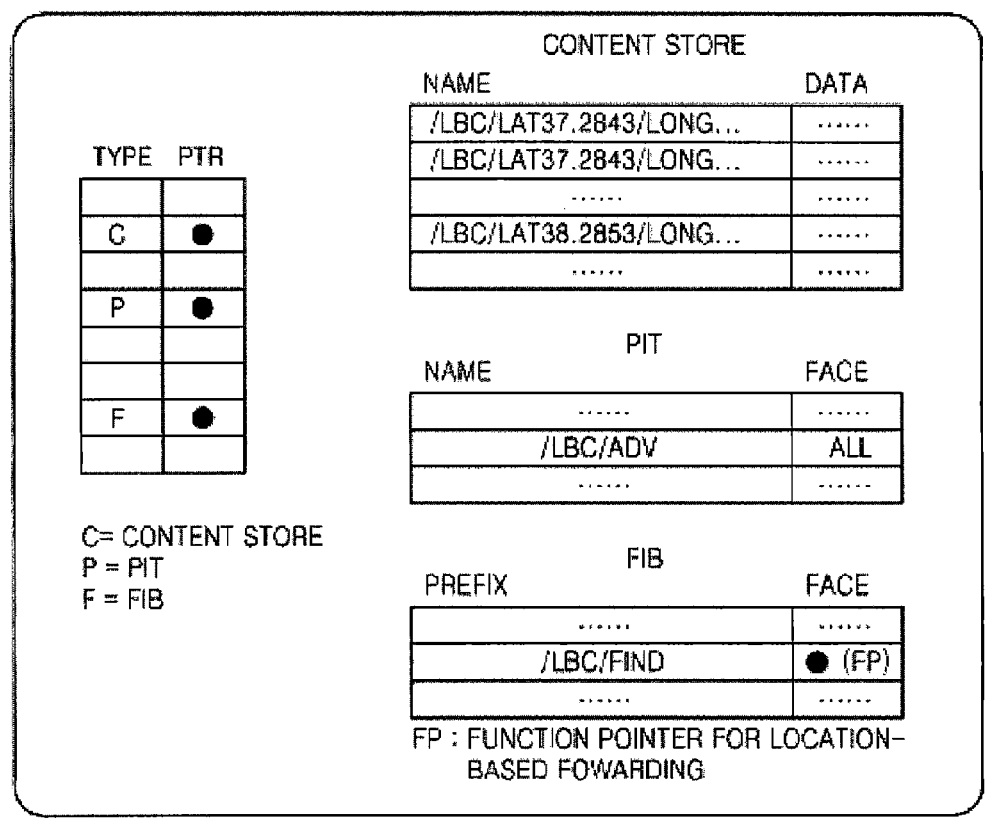
FIG. 1 is a diagram illustrating an example of a structure of a location-based content-centric networking for the location-based content according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Content-centric networking operation mechanism for a location-based content-centric networking method in accordance with an exemplary embodiment is described herein.

The content-centric networking is based on two types of messages: interest and data.

The content-centric networking may use a method of "content request->content transmission" in which, in response to a user's interest in certain content, that is, a user's request or query about the content, being sent based on a name of the desired content, an intermediate node or a terminal node, which has corresponding content, transmits the content (i.e., data) to the user. Here, the nodes may refer to devices that provide cache or content-centric networking, or that provide similar functions.

Figure 2:
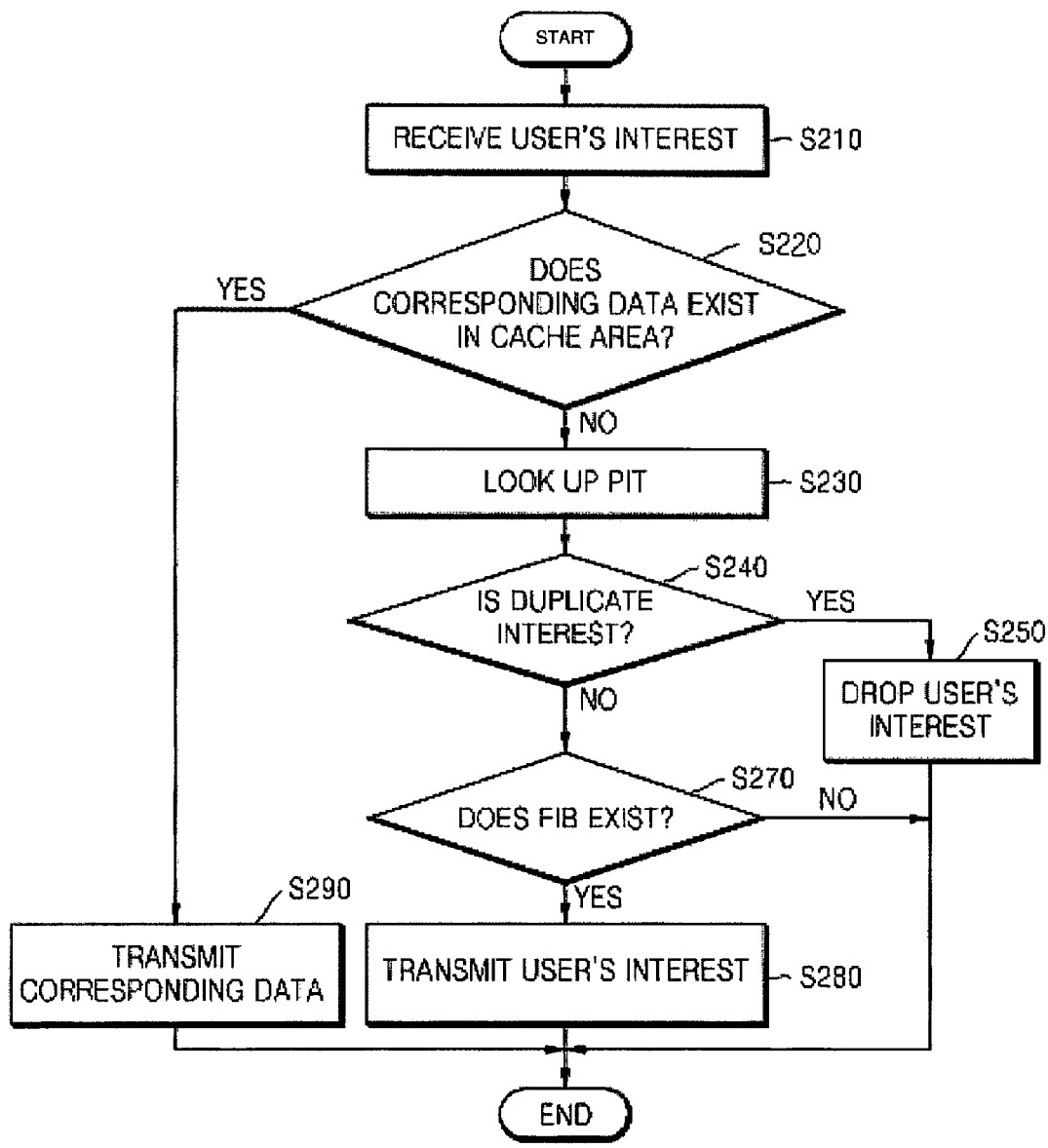
FIG. 2 is an exemplary flowchart illustrating procedures performed by an intermediate node that receives interest.

FIG. 2 is an exemplary flowchart illustrating procedures performed by an intermediate node that receives interest. In a case where the intermediate node has corresponding content, the intermediate node transmits data containing the corresponding content through a path reverse to a transfer path of the interest. In a case where the intermediate node does not have the corresponding content and if the interest is not duplicate interest, a routing table (forwarding information base (FIB) table) with content names as identifiers is searched to find a routing list that matches or is relevant to a content name included in the interest. If the matching or relevant routing list is found, the intermediate node forwards the interest through a corresponding path.

More specifically, in S210, a user's interest is received. Although "interest" is a superordinate concept to "request" and "query," it will be, hereinafter, referred to as "request." The user's request may be received from an initial terminal that issues a request for data or an intermediate node that receives the request for data.

In S220, the intermediate node determines whether the requested data exists in a cache area. If a determination is made that the requested data exists in the cache area, corresponding data is transmitted through a path reverse to a path through which the user's request is transferred in S290.

If it is determined that the requested data is not present in the cache area, information of a pending interface table (PIT) is looked up in S230 to determine whether the user's request is a duplicate request in S240.

In response to a determination being made that the user's request is a duplicate request, the user's request is dropped in S250, and otherwise, it is determined, in S270, whether forwarding information base (FIB) exists. In response to a determination being made that the FIB exists, the user's request is transmitted to a neighboring node in S280.

There may be three critical factors in implementation of the above content-centric networking. The first is "content naming" to name content for identification, the second is "routing" or "forwarding" to assign the content name as an identifier, and the final is "cache management" performed in the process of "content request"->"content transmission." The exemplary embodiments described herein are related to the provision of the three core factors.

A method for acquiring location information and a practical method of implementing content-centric networking are not within the scope of the present invention. In addition, in the following description, a detailed description of known functions and configurations incorporated herein will be omitted when it may obscure the subject matter with unnecessary detail. Further, terminology used herein is for the purpose of describing particular embodiments only and is not intended to be limiting of the present disclosure. The terms used herein are defined in consideration of functions according to exemplary embodiments, and can be varied according to a purpose of a user or manager, or precedent and so on. Therefore, definitions of the terms should be made on the basis of the overall context.

<Location-Based Content Naming>

Content naming for identification of content, as the most fundamental factor for the content-centric networking, is generally performed by first allocating a hierarchical prefix to a location (a physical location or a logical location) at which the content is present and then associating the prefix and a name of the content (e.g., file name, context name, etc.).

Such content naming is based on longest prefix matching (LPM) used in an IP-based network, and has, thus, an advantage in facilitating data routing based on the content name. For example, according to the above content naming, a document created by Ubiquitous Networked System (UbiNes) lab of Ajou University in Korea may be named as "/Korea/Ajou_Univ/UbiNeS/Report_CCN."

In one example, a special prefix is assigned to identify location-based content in the content-centric networking. For example, a prefix, such as "/LBC," may be placed at the very beginning of a content name, thereby facilitating the process branching based on an LPM algorithm.

In addition, a predefined prefix may be used to clarify the user's intention and purpose of the location-based content. For example, a prefix, such as "/FIND," may be assigned if the user's intention is to search for location-based content. As another example, a prefix, such as "/ADV," may be used if the user's intention is to advertise newly created location-based content. To classify location-based content as, for example, food, a context name, such as "/FOOD," may be used.

In addition, a location at which location-based content is created is included in the name of the content. The creation location may be specified based on a geographical location (e.g., GPS coordinates and latitude/longitude coordinates), a logical location (e.g., predefined grid coordinates), landmarks (e.g., Incheon Airport, Seoul station, etc.) or based on a combination thereof.

Figure 4:
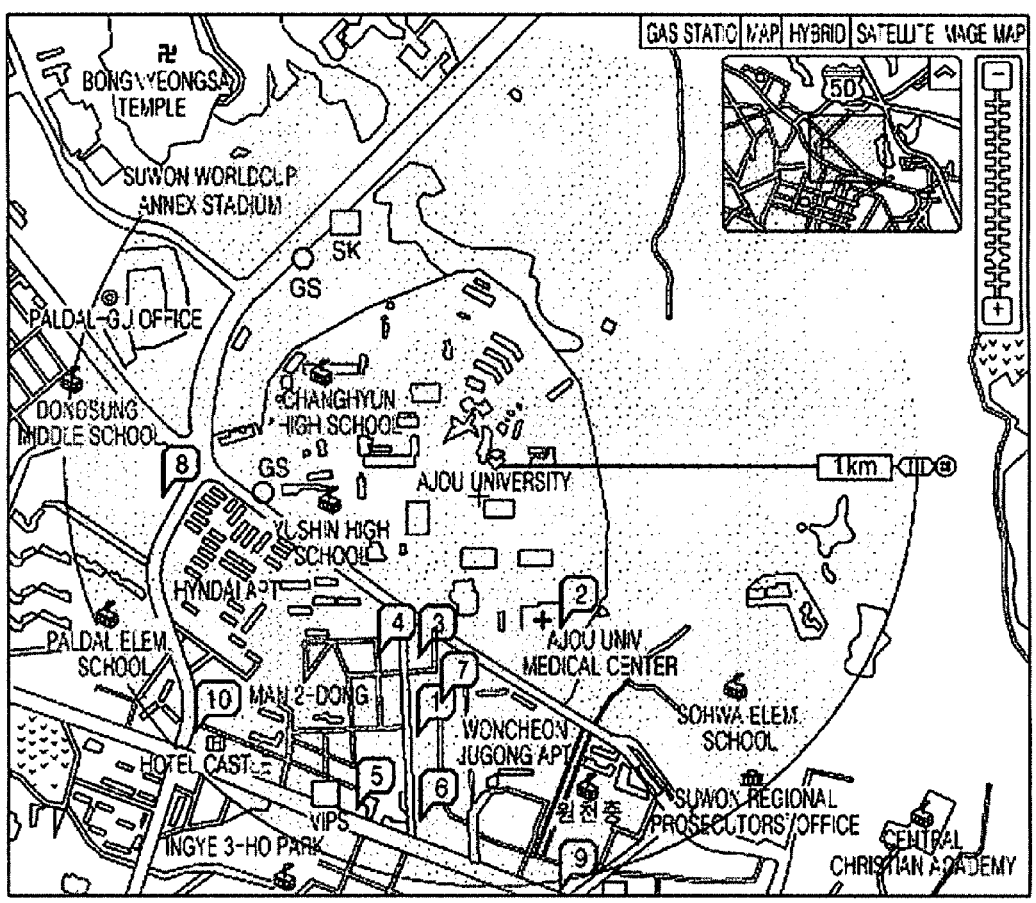
FIG. 4 is a diagram illustrating examples of collected location-based content.

Examples of naming of location-based content are provided below, which are illustrated in FIG. 4.

Referring to FIG. 4, in a case where a user searches for information about café within a radius of 1 km from Ajou University in Korea, the content may be named as "/LBC/FIND/LAT37.2843/LONG127.0444/R1Km/CAFÉ" based on a geographical location of Ajou university, which is 37.2843 degrees north latitude and 127.0444 degrees west longitude, or may be named as "/LBC/FIND/Ajou_Univ/R1Km/CAFÉ" based on a landmark. The content search results may be obtained as shown in FIG. 4.

<Location-Based Content-Centric Routing>

The routing or forwarding of the location-based content in accordance with the exemplary embodiment of the present invention may have primarily two purposes. The first is to advertise or send the notification of created or updated location-based content to neighbors, and the second is to acquire user's desired location-based content. These two purposes are distinguished by the content names. For example, the content may start with a predefined prefix, such as "/LBC/ADV," for the first purpose, or with a predefined prefix, such as "LB C/FIND," for the second purpose.

To notify the neighbors of created or updated location-based content, an owner of the relevant content propagates data (content) to the neighbors. In this case, to conform to an operating method of the content-centric networking, i.e., "content request->content transmission," information for the location-based content is defined in advance in the PIT, so that the data propagation is enabled by broadcasting the data to the neighbors under the restriction that the content is previously requested. As a prefix registered in the PIT, "LBC/ADV" may be used (refer to FIG. 1). Accordingly, the data may be propagated in the same way as it is forwarded in response to a user's request. In this case, the location of creating the location-based content, a location of a node receiving the data, and available cache space of the node receiving the data may act as variables to limit the propagation distance.

Figure 3:
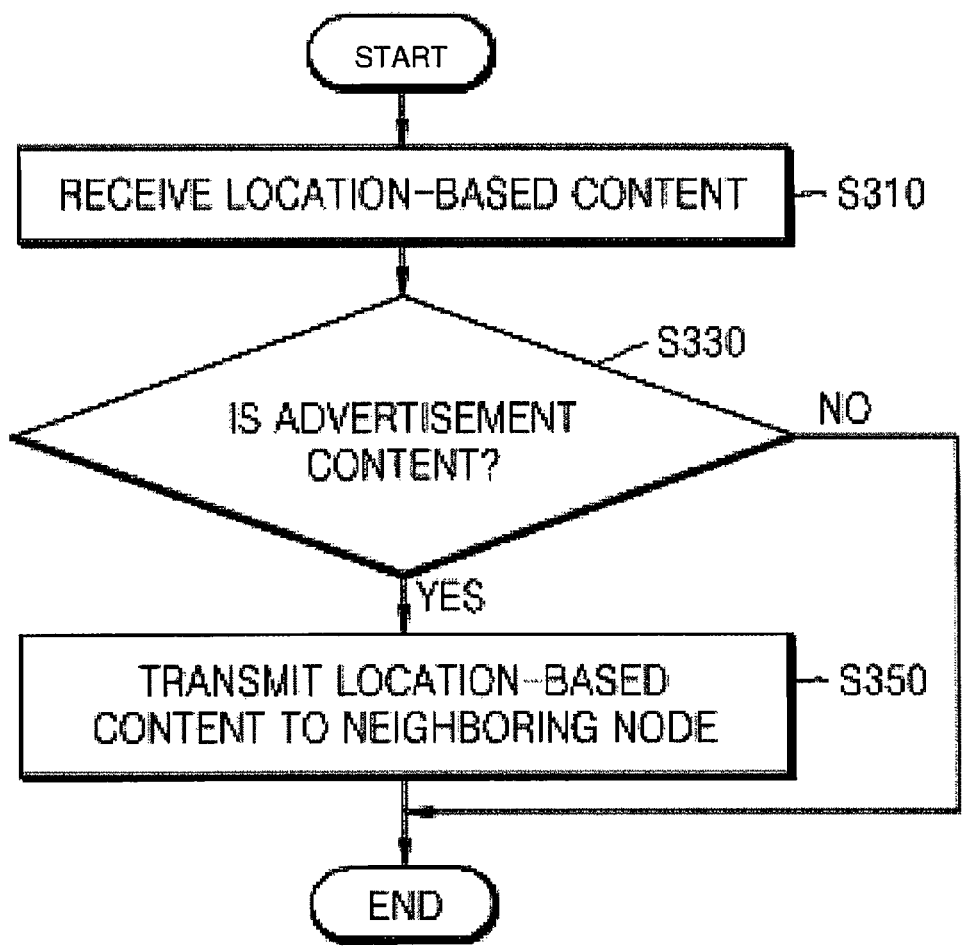
FIG. 3 is a flowchart illustrating an example of a content advertising method according to an exemplary embodiment of the present invention.

FIG. 3 illustrates a flowchart of an example of a content advertising method in accordance with the first purpose described above. Referring to FIG. 3, in response to location-based content being received in S310, a name assigned to the received content is analyzed to determine whether the content is advertisement content in S330. In response to a determination being made that the received location-based content is advertisement content, the received content is transmitted, in S350, to neighboring nodes according to the predetermined rules, as described above.

Moreover, to acquire location-based content, a user request (interest) containing an identifier (name) of the user's desired location-based content is transmitted. As an example of the content identifier, the content name, such as "/LBC/FIND/LAT37.2843/LONG127.0444/R1Km/CAFÉ" provided above, may be used. Further, to process the user's request for the location-based content, a specific processing function for the prefix, for example, "LBC/FIND," may be invoked (refer to FIG. 1). The processing function is executed to determine a transmission path through which the user's request (interest) is transmitted, based on location information contained in the name of the location-based content and location information of the node that receives the request. If the identifier of the location-based content does not exist in a cache area, the node that receives the request (interest) forwards the request to a location included in the name of the location-based content, by means of the processing function.

<Location-Based Content Cache Management>

In the exemplary embodiments of the present invention, two cache areas are defined. A first cache area caches location-based content which is created in the proximity of where a node exists, and a second cache area caches location-based content which is created at a distant location from where the node is present.

In the content-centric networking which does not deploy a third server for sharing content, the first cache area performs a role of a local server for the location-based content created in the proximity of where the node exists. In the course of advertising the location-based content, a node that has received the location-based content determines whether to cache the advertised location-based content, based on a distance from a location of creating the content. With respect to cache replacement, the first cache area does not remove but retains the location-based content for a predetermined period of time by means of an exclusive hold timer, thereby acting as a local server.

The second cache area is provided for caching in the process of reverse-path forwarding of data which is generated in response to a request created by the Internet user. There may be generally two types of cache management schemes for the content-centric networking: cache replication and cache replacement. Cache replication is to determine whether to cache data, and cache replacement is to choose victim content in the event of lack of sufficient cache space.

In the aforementioned caching procedures according to the exemplary embodiments, location information included in the data, regarding the location at which the location-based content is created, and location information of a node that receives the data are utilized. As a distance between the locations indicated by each of the location information becomes greater, a probability of the location-based content being a target of cache replication may be decreased, while a probability of being a target of cache replacement may be increased. Accordingly, a probability of content being cached may be set to be decreased with an increase of a distance between the location contained in the data and the location at which the content is created. This is because generally Internet users request location-based content that is located in user's proximity.

In one exemplary embodiment, a content search method for searching for location-based content cached by the two schemes in response to a user's request is provided. In response to receiving the user's request (interest), a node searches for the requested content from among pieces of location-based content cached by the second cache area. Like the content search performed in general content-centric networking, the searching may be carried out by immediate matching of the pieces of content, based on the content name included in the request.

If the node that receives the request fails to find the desired location-based content via the immediate match, the node searches for the content from among pieces of location-based content cached by the first cache area. The node that receives the request finds the desired location-based content based on content name specified in the request, and aggregates all the found location-based content into a single piece of data. Then, through a reverse path of the request, the node transmits the data to the user who creates the request.

Here, a determination whether the node has the requested location-based content may be made by comparing an area of the location-based content and the creation location at which the location-based content cached by the first cache area of the node which receives the request is created. If the remotest location-based content, among pieces of location-based content stored in the cache of the node that receives the request, is located farther than the location of creating the requested location-based content, a determination may be made that the node has the requested location-based content.

A primary purpose of a meta-algorithm for cache management according to the exemplary embodiment of the present invention is to allow a node to retain closely located content for as long as possible. By use of this meta-algorithm, the node can perform a role of a local content server. Referring back to FIG. 1, content store, which is a content area, is generally divided into two zones: cold zone and hot zone. Cold zone is cache space for content created in an area to which the node belongs or in the proximity of the node, and the cold zone acts as a local content server. Hot zone is cache space for content created remote from the node, where content replacement frequently takes place according to a content request pattern of the Internet user. An example of the cold zone is shown as the shaded region of the content store of FIG. 1.

The meta-algorithm for cache management with a content store structure to cache content newly received in the data packet forwarding process may generally consist of two stages.

In the first stage, cache replication is performed to determine whether to cache received content by taking into consideration variables, such as a distance to a location at which the content is created, content creator information ("Signed Info" field of data packet), etc. At this time, a zone in which the content is to be cached is also determined. Generally, it is more frequent to request information about the nearby content than information about the remote location, and hence a cache probability may be designed to be decreased with an increase in the distance. Further, the reliability of the content creator may be taken into account in the cache probability. For example, since an administrator of online community website has more reliability than others, content, for example, menus in the website, which is made by the administrator, may be given a higher probability of being cached.

In the second stage, in the event of there being lack of storage space to cache new content in the content store, cache replacement is performed to determine which content to be replaced with the new content. In the case of cold zone, as performed in the first stage, variables are taken into account to select content to be first deleted from the cache area, wherein the selected content may be located far from the node and created by a creator with a lower reliability. If content having old information with the same context as the context of the new content is present in the cache area, this content is replaced with the new content.

In the case of hot zone, various existing content replacement algorithm can be applied to the content which is located far from the node, variables, such as a distance or a creator, may be assigned as weights.

The content cached in the cold zone may be a subset of requested information included in the content name. Therefore, pieces of content having the same name in the cold zone may be processed by an aggregation operation. Further, although the content cached in hot zone includes all the requested information that are indicated by the content name, periodic update of content is performed in consideration of the lifetime of content created by a user.

As apparently described above, the location-based content-centric networking method provides content naming, which enables the user to identify the location-based content and the user's intention of use, allows neighboring terminals to recognize the created location-based content, and offers a method of requesting and acquiring the location-based content and the cache management schemes, and thereby it is possible to effectively transmit the location-based content.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A location-based content-centric networking method for a location-based content, comprising:
naming the location-based content including assigning a name to the location-based content, wherein the name includes a hierarchical prefix corresponding to information contained in the location-based content;
caching the location-based content;
receiving a user's interest for requesting the location-based content; and
forwarding the location-based content based on prefix information of the location-based content,
wherein the forwarding the location-based content comprises transmitting the location-based content to neighboring nodes so as to advertise the location-based content, and
wherein the caching the location-based content comprises determining, at a node that receives the location-based content, whether to cache the advertised location-based content, based on a distance between the node and the location at which the location-based content is created
wherein in the determining whether to cache the advertised location-based content, a cache probability is decreased with an increase in the distance.

2. The location-based content-centric networking method of claim 1, wherein the naming the location-based content comprises defining a first prefix at a very beginning of the name in order to distinguish the location-based content from other content by means of a longest prefix matching (LPM) scheme.

3. The location-based content-centric networking method of claim 1, wherein the naming the location-based content comprises defining a second prefix to classify a user's intention.

4. The location-based content-centric networking method of claim 3, wherein the user's intention is to search or to advertise content.

5. The location-based content-centric networking method of claim 1, wherein the naming the location-based content comprises defining a third prefix to classify a type of the location-based content.

6. The location-based content-centric networking method of claim 1, wherein the naming the location-based content comprises defining a fourth prefix including location information of the location-based content.

7. The location-based content-centric networking method of claim 1, wherein the naming the location-based content comprises defining a fifth prefix including a context name as a target of the location-based content.

8. The location-based content-centric networking method of claim 1, wherein the user's interest includes an identifier of the location-based content requested by a user.

9. The location-based content-centric networking method of claim 1, further comprising transmitting the user's interest to the neighboring nodes so as to acquire the location-based content requested by the user.

10. The location-based content-centric networking method of claim 9, wherein the forwarding the location-based content utilizes location information about where the location-based content is created and location information of a node that receives the user's interest or the location-based content.

11. The location-based content-centric networking method of claim 10, the forwarding the location-based content to the neighboring nodes comprises advertising created or updated location-based content to nodes within a predetermined range of area according to predefined rules.

12. The location-based content-centric networking method of claim 11, wherein a prefix which indicates advertisement of the location-based content is previously registered in a pending interest table (PIT).

13. The location-based content-centric networking method of claim 11, wherein a geographical range within which the location-based content is advertised is determined by utilizing information about a distance between the location at which the location-based content is created and the location of the node.

14. The location-based content-centric networking method of claim 9, wherein the forwarding the location-based content comprises forwarding the user's interest for the location-based content using location information contained in the location-based content.

15. The location-based content-centric networking method of claim 14, further comprising:
registering in forwarding information base (FIB) prefix information which confirms that the location-based content is location-based content, so as to invoke a function to perform location-based forwarding with respect to the prefix information.

16. The location-based content-centric networking method of claim 9, wherein the caching the location-based content comprises caching data in response to the user's interest, wherein a probability of cache replication being executed is set to be reduced with an increase in a distance between a node that receives the data and a target location of location-based content included in the data.

17. The location-based content-centric networking method of claim 9, wherein the caching the location-based content comprises caching data in response to the user's interest, wherein a probability of cache replacement being executed is set to be increased with an increase in a distance between a node that receives the data and a location of the location-based content stored in the cache.

* * * * *